United States Patent
Tsai et al.

(10) Patent No.: US 8,291,194 B2
(45) Date of Patent: Oct. 16, 2012

(54) METHODS OF UTILIZING ADDRESS MAPPING TABLE TO MANAGE DATA ACCESS OF STORAGE MEDIUM WITHOUT PHYSICALLY ACCESSING STORAGE MEDIUM AND RELATED STORAGE CONTROLLERS THEREOF

(75) Inventors: Jeng-Horng Tsai, Kao-Hsiung (TW); Hong-Ching Chen, Kao-Hsiung Hsien (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 495 days.

(21) Appl. No.: 12/619,645

(22) Filed: Nov. 16, 2009

(65) Prior Publication Data

US 2011/0119455 A1 May 19, 2011

(51) Int. Cl.
*G06F 12/00* (2006.01)
(52) U.S. Cl. ........ 711/202; 711/103; 711/133; 711/159; 711/206
(58) Field of Classification Search .................. None
See application file for complete search history.

(56) References Cited

U.S. PATENT DOCUMENTS

| | | | |
|---|---|---|---|
| 5,963,982 A | 10/1999 | Goldman | |
| 5,991,847 A | 11/1999 | Ballard | |
| 6,038,636 A | 3/2000 | Brown | |
| 6,397,311 B1 | 5/2002 | Capps | |
| 7,979,663 B2 | 7/2011 | Tomonaga | |
| 2005/0231765 A1* | 10/2005 | So et al. | 358/1.16 |
| 2009/0089518 A1* | 4/2009 | Hobbet et al. | 711/155 |
| 2010/0217918 A1* | 8/2010 | Chen | 711/103 |

FOREIGN PATENT DOCUMENTS

| | | |
|---|---|---|
| CN | 101272332 B | 9/2011 |
| CN | 101533337 B | 4/2012 |

* cited by examiner

*Primary Examiner* — Shawn X Gu
(74) *Attorney, Agent, or Firm* — Winston Hsu; Scott Margo (57) ABSTRACT

A method of managing data access of a storage medium includes establishing an address mapping table to record a physical address of a first data stored in the storage medium, where the physical address of the first data is mapped to a logical address of the first data; and when receiving a command for handling the first data stored in the storage medium internally, processing the address mapping table to serve the command without physically accessing the first data stored in the storage medium.

28 Claims, 10 Drawing Sheets

| Conventional ATA command | New non-data command | New PIO/DMA data-out command |
|---|---|---|
| - Move first block<br>1. H2D register FIS (Read DMA, Count=1, LBA=90)<br>2. D2H data FIS (data moves to host)<br>3. D2H register FIS (return command status)<br>4. H2D register FIS (Write DMA, Count=1, LBA=35)<br>5. H2D data FIS (data moves to device)<br>6. D2H register FIS (return command status)<br>- Trim<br>1. H2D register FIS (Trim, LBA=90)<br>2. D2H register FIS (return command status)<br>- Move second block<br>1. H2D register FIS (Read DMA, Count=1, LBA=89)<br>2. D2H data FIS (data moves to host)<br>3. D2H register FIS (return command status)<br>4. H2D register FIS (Write DMA, Count=1, LBA=36)<br>5. H2D data FIS (data moves to device)<br>6. D2H register FIS (return command status) | - Move first block<br>1. H2D register FIS (IDM-1, Count=1, Type=1, Initial LBA=90, Target LBA=35)<br>2. D2H register FIS (return command status)<br>- Move second block<br>1. H2D register FIS (IDM-1, Count=1, Type=0, Initial LBA=89, Target LBA=36)<br>2. D2H register FIS (return command status) | - Move first and second blocks<br>1. H2D register FIS (IDM-2, Set number=2)<br>2. H2D data FIS (data moves to device)<br>• Set 1, Count=1, Type=1, Initial LBA=90, Target LBA=35<br>• Set 2, Count=1, Type=0, Initial LBA=89, Target LBA=36<br>3. D2H register FIS (return command status) |

METHODS OF UTILIZING ADDRESS MAPPING TABLE TO MANAGE DATA ACCESS OF STORAGE MEDIUM WITHOUT PHYSICALLY ACCESSING STORAGE MEDIUM AND RELATED STORAGE CONTROLLERS THEREOF

BACKGROUND

The disclosed embodiments of the present invention relate to accessing a storage medium, and more particularly, to methods of utilizing an address mapping table, such as a flash translation layer (FTL) mapping table, to manage data access of a storage medium, such as a solid-state disk or a hard disk, without physically accessing the storage medium and related storage controllers thereof.

In general, fragmented files are files whose contents are split up into chunks, and stored in various locations within a storage medium. Fragmentation occurs over time as the files on the storage medium are added, deleted and modified. Therefore, defragmentation technique is commonly employed in a file system to reduce the number of fragmented files. Taking a hard disk drive for example, the data access performance highly depends upon the seeking performance of a magnetic head. If contents of a file can be recorded in successive storage areas on a hard disk, the seeking time required by the magnetic head can be significantly reduced, leading to improved data access performance accordingly. With regard to a solid-state disk (SSD) drive, the storage medium is generally consisted of flash memory devices. As the flash memory device has the random access capability, the SSD drive, compared to the hard disk drive, may not need file defragmentation applied thereto for reducing the seek time. In addition, the flash memory device has its limited service life due to the inherent characteristics thereof. As the file defragmentation generally requires data move operations, the flash memory device is read and written many times during the file defragmentation process, which may shorten the service life of the SSD drive. However, in a case where the service life of the flash memory is not affected, the file defragmentation applied to the SSD drive to make the contents of the files stored in successive storage areas might gain certain benefits. For example, the required file management effort is simplified and the data access speed can be increased accordingly; in addition, the efficiency of releasing the occupied storage areas as free areas can be improved.

Thus, what is needed is a data handling scheme that allows for efficient file defragmentation/data access of a storage medium.

SUMMARY

In accordance with embodiments of the present invention, methods of utilizing an address mapping table, such as a flash translation layer (FTL) mapping table, to manage data access of a storage medium, such a solid-state disk or a hard disk, without physically accessing the storage medium and related storage controllers thereof are proposed.

According to a first aspect of the present invention, a method of managing data access of a storage medium is provided. The method includes: establishing an address mapping table to record at least a physical address of a first data stored in the storage medium, where the physical address of the first data is mapped to a logical address of the first data; and when receiving a command for handling at least the first data in the storage medium internally, processing the address mapping table to serve the command without physically accessing at least the first data stored in the storage medium.

According to a second aspect of the present invention, a method of managing data access of a storage medium is provided. The method includes: establishing an address mapping table to record a particular data pattern mapped to a logical address; and when receiving a command for reading data addressed by the logical address from the storage medium, outputting the particular data pattern recorded in the address mapping table in response to the command without physically accessing the storage medium.

According to a third aspect of the present invention, a method of managing data access of a storage medium is provided. The method includes: providing an address mapping table; and when receiving a command for writing a particular data pattern into the storage medium according to a logical address, making the address mapping table record the particular data pattern mapped to the logical address in response to the command without physically accessing the storage medium.

According to a fourth aspect of the present invention, a storage controller for managing data access of a storage medium is provided. The storage controller includes: a storage unit, storing an address mapping table to record at least a physical address of a first data stored in the storage medium, where the physical address of the first data is mapped to a logical address of the first data; and a processing unit, coupled to the storage unit, wherein when receiving a command for handling at least the first data in the storage medium internally, the processing unit processes the address mapping table to serve the command without controlling the storage medium to physically access at least the first data stored therein.

According to a fifth aspect of the present invention, a storage controller for managing data access of a storage medium is provided. The storage controller includes: a storage unit, storing an address mapping table to record a particular data pattern mapped to a logical address; and a processing unit, coupled to the storage unit, wherein when receiving a command for reading data addressed by the logical address from the storage medium, the processing unit outputs the particular data pattern recorded in the address mapping table in response to the command without controlling the storage medium to physically access data stored therein.

According to a sixth aspect of the present invention, a storage controller for managing data access of a storage medium is provided. The storage controller includes: a storage unit, storing an address mapping table; and a processing unit, coupled to the storage unit, wherein when receiving a command for writing a particular data pattern into the storage medium according to a logical address, the processing unit sets the address mapping table to record the particular data pattern mapped to the logical address in response to the command without controlling the storage medium to physically access data stored therein.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

An address mapping table can be used to record a mapping between a logical address used by a host and a physical address used by a storage device. For example, regarding an SSD application, a flash translation layer (FTL) mapping table is employed to convert a logical block address (LBA) generated from a host into a physical block address (PBA) actually used by an SSD drive. The main conception of the present invention is to serve the command issued from a host by processing the address mapping table without physically accessing (reading or writing) a storage medium of the storage device. In this way, the defragmentation performance can be improved greatly. Further details are described as follows.

Figure 1:
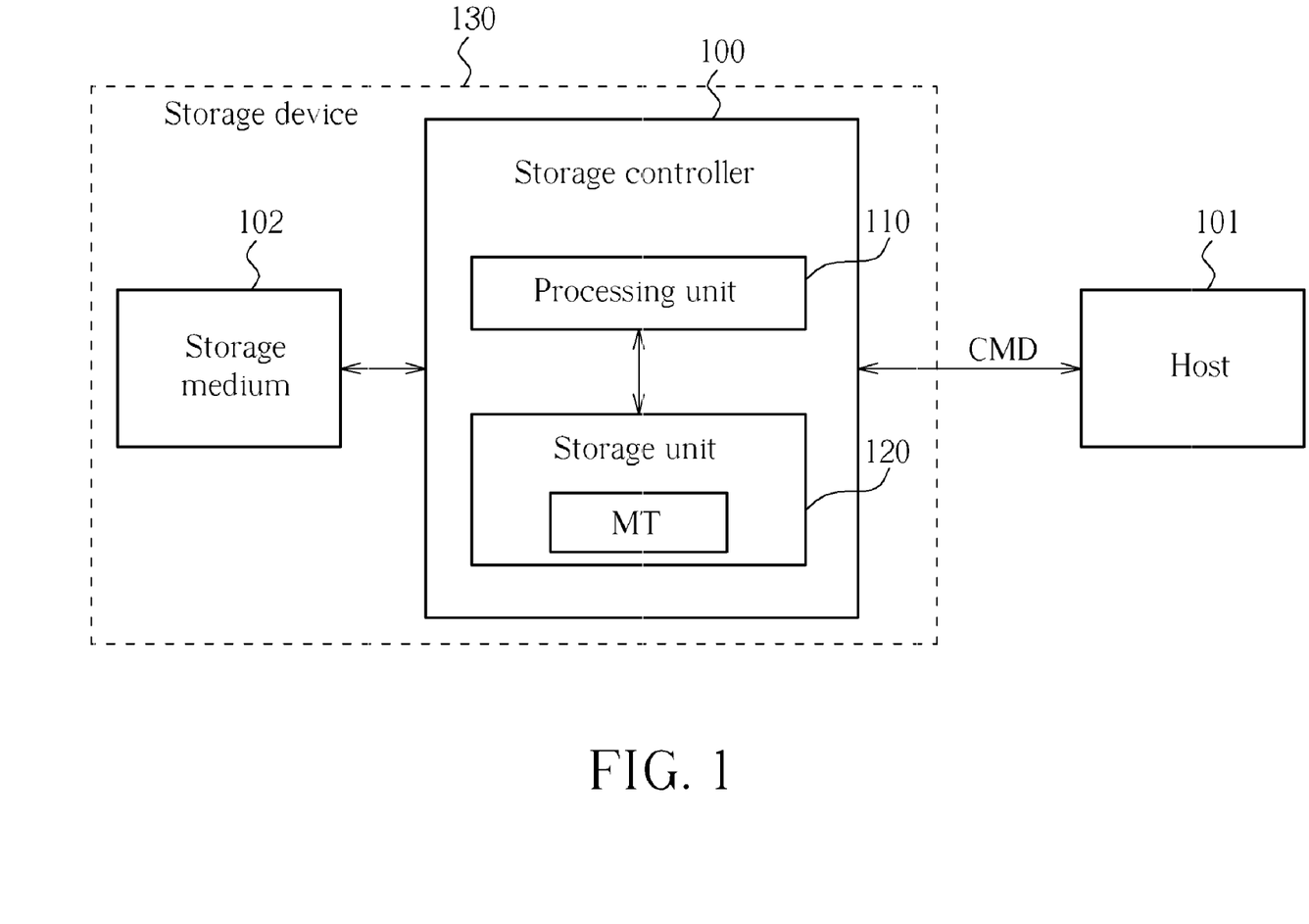
FIG. 1 is a block diagram illustrating an exemplary embodiment of a storage controller according to the present invention.

FIG. 1 is a block diagram illustrating an exemplary embodiment of a storage controller according to the present invention. The exemplary storage controller 100 is coupled between a host 101 and a storage medium 102, and is utilized for managing data access of the storage medium 102 according to a command CMD issued by the host 101. In this embodiment, the storage controller 100 includes, but is not limited to, a processing unit 110 and a storage unit 120 coupled to the processing unit 110. The processing unit 110 can be implemented using hardware, software, or a combination thereof. By way of example, but not limitation, the processing unit 110 may include a processor which executes firmware to perform its intended functions. The storage unit 120 may be implemented using a memory device (e.g., a dynamic random access memory) for buffering an address mapping table MT (e.g., an FTL mapping table).

In most storage applications, a storage controller would have a storage controller included therein. For example, in this exemplary embodiment shown in FIG. 1, the storage controller 100 and the storage medium 102 are both integrated within a storage device 130. In a case where the storage device 130 is a hard disk drive, the storage medium 102 is a hard disk. In another case where the storage device 130 is a solid-state disk drive, the storage medium 102 is composed of flash memory devices. However, this is for illustrative purposes only. In an alternative design, the storage controller 100 may be a controller external to a storage device having the storage medium 102 included therein. That is, the storage medium 102 is disposed within a storage device, whereas the storage controller 100 is disposed outside of the storage device. Such a hardware configuration also falls within the scope of the present invention.

In one operational scenario of the storage controller 100, the address mapping table MT records at least a physical address of data stored in the storage medium 102, where the physical address is mapped to a logical address of the data, and when the processing unit 110 receives the command CMD for handling at least the data in the storage medium 102 internally (i.e., there is no data transfer between the storage controller 100 and the host 101 in response to the command CMD), the processing unit 110 serves the command CMD without controlling the storage medium 102 to physically access at least the data stored therein.

Figure 2:
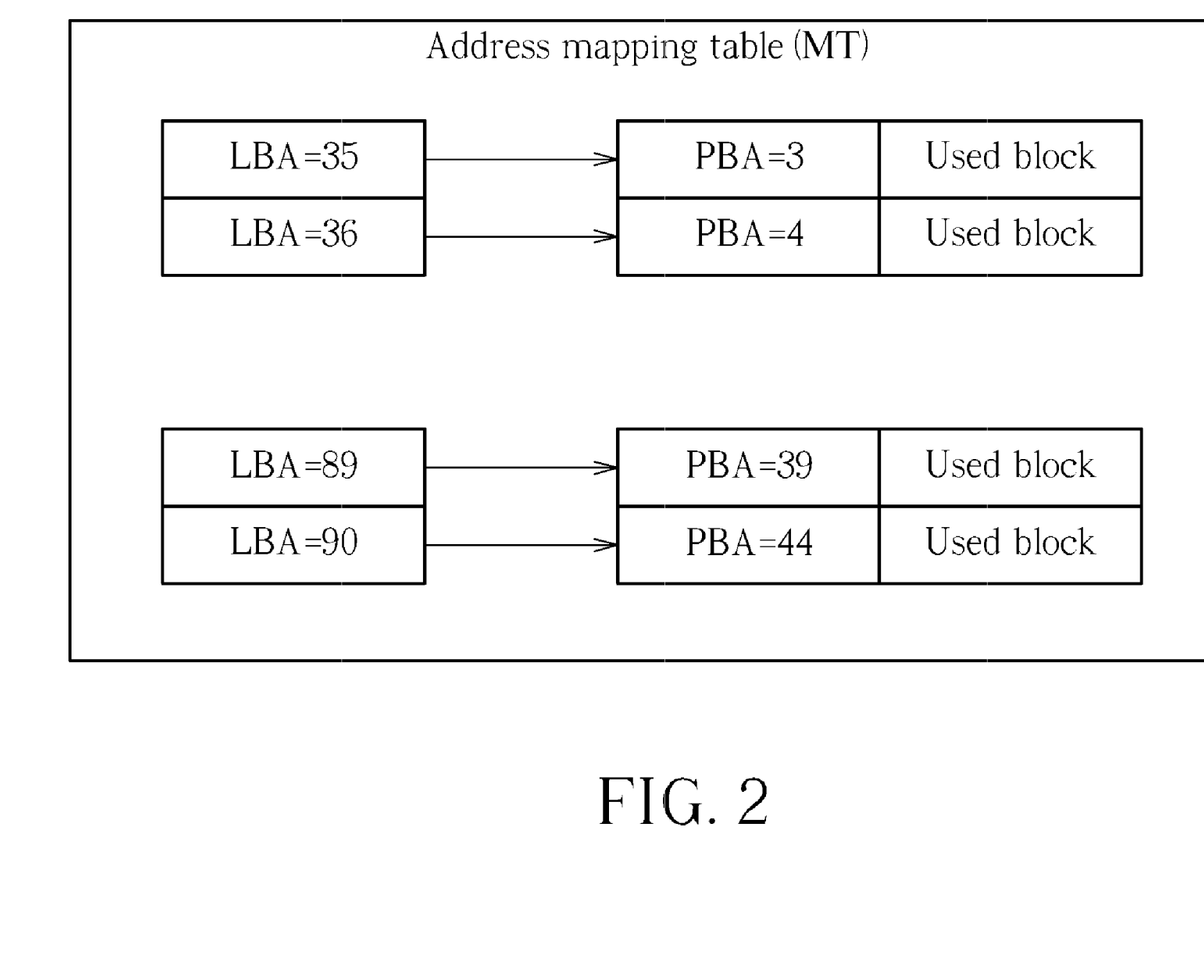
FIG. 2 shows an exemplary address mapping table.

Please refer to FIG. 2, which shows an exemplary address mapping table MT. As can be seen from FIG. 2, the logical block address (LBA) "35" is mapped to the physical block address (PBA) "3", the logical block address "36" is mapped to the physical block address "4", the logical block address "89" is mapped to the physical block address "39", and the logical block address "90" is mapped to the physical block address "44". In addition, as physical blocks of the storage medium 102 addressed by the physical block addresses "3", "4", "39" and "44" have data stored therein, the address mapping table MT further records a block status for each mapping relationship between the logical address and the physical address to indicate that the physical block addressed by the corresponding physical address is used.

Figure 3:
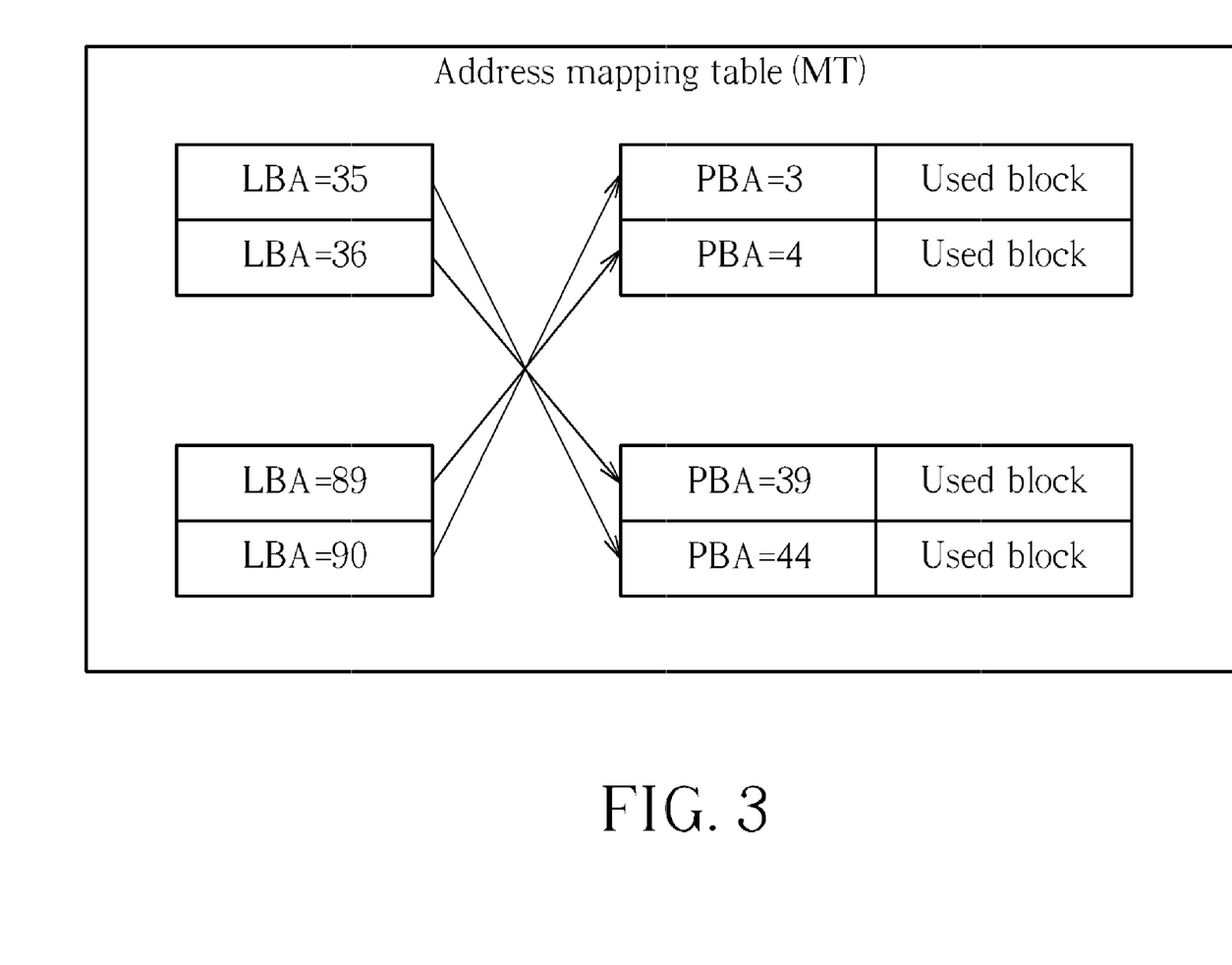
FIG. 3 shows an updated address mapping table.

In a case where the command CMD is an internal data swap command proposed by an exemplary embodiment of the present invention for swapping a first data and a second data stored in the storage medium 102. The processing unit 110 serves the command CMD through updating the address mapping table MT. For example, the processing unit 110 swaps the recorded physical address of the first data mapped to the logical address of the first data and the recorded physical address of the second data mapped to the logical address of the second data. In this way, the updated address mapping table records the physical address of the first data mapped to the logical address of the second data and records the physical address of the second data mapped to the logical address of the first data. For example, the command CMD is intended for swapping data stored in logical block addresses "35" and "90", and swapping data stored in logical block addresses "36" and "89". The processing unit 110 serves the command CMD by mapping the logical block addresses "35", "36", "89" and "90" to the physical block addresses "44", "39", "4", and "3", respectively. The updated address mapping table MT is shown in FIG. 3.

Figure 4:
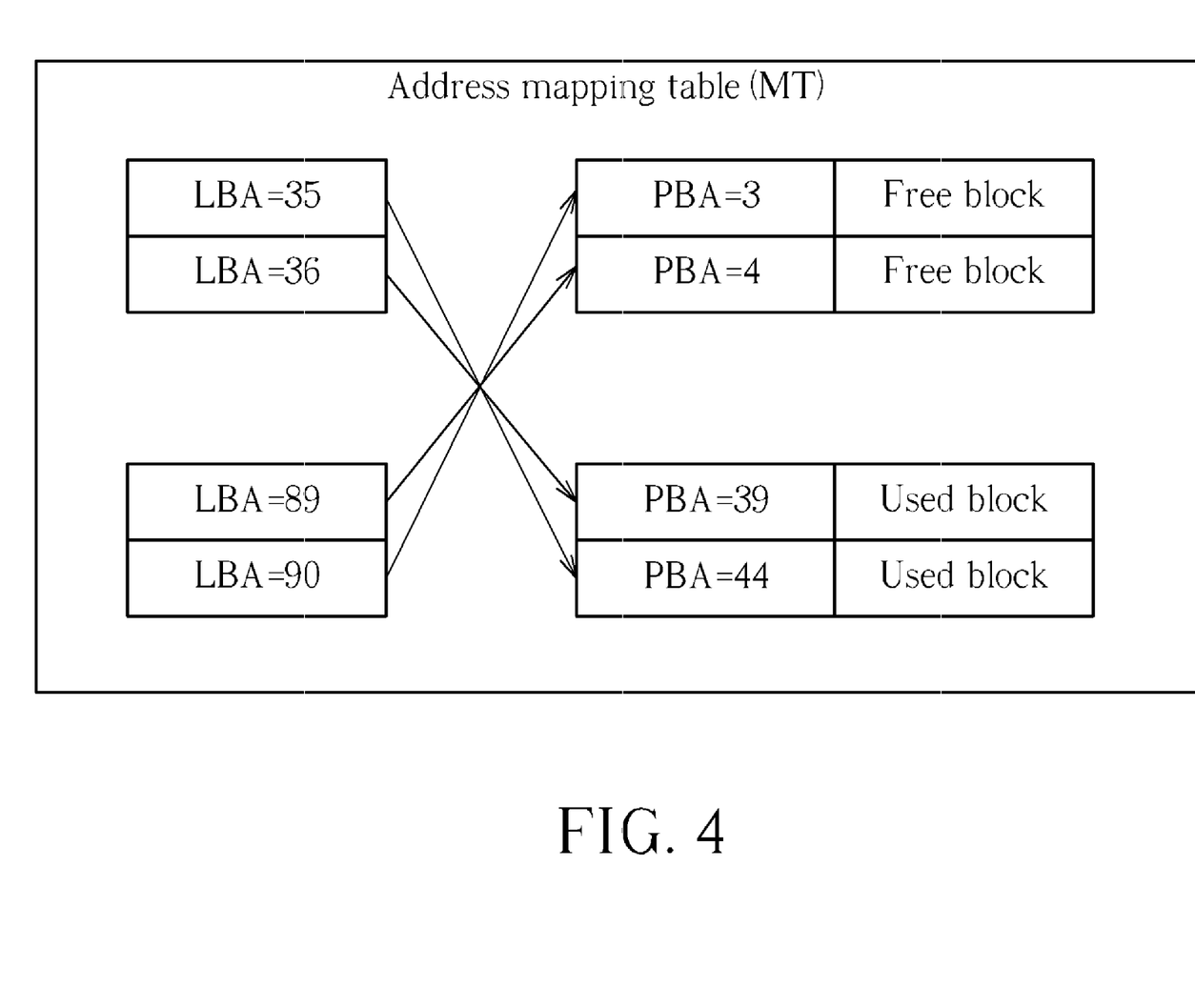
FIG. 4 shows another updated address mapping table.

In another case where the command CMD is an internal data move with auto-free command for moving a first data stored in a physical address of the storage medium 102 to a specific physical address of the storage medium 102, and thus releasing a physical block addressed by the physical address. The processing unit 110 serves the command CMD through updating the address mapping table MT. For example, the processing unit 110 replaces the physical address of the first data mapped to the logical address of the first data with the specific physical address, and then modifies the block status of the physical block to indicate that the physical block is a free block. In this way, the updated address mapping table records the specific physical address mapped to the logical address of the first data. For example, the command CMD is intended for swapping data stored in logical block addresses "35" and "90", swapping data stored in logical block addresses "36" and "89", and releasing physical blocks originally corresponding to the logical block addresses "35" and "36". The processing unit 110 serves the command CMD by mapping the logical block addresses "35", "36", "89" and "90" to the physical block addresses "44", "39", "4" and "3", respectively, and then modifies the block statuses of the physical block addressed by the physical block addresses "3" and "4" to indicate that these physical blocks are free blocks now. The updated address mapping table MT is shown in FIG. 4.

To support the above-mentioned internal data move commands (i.e., new non-data commands shown in FIG. 5), the present invention therefore proposes a new command protocol different from the conventional ATA (Advanced Technology Attachment) command protocol. The new non-data command includes certain parameters, such as initial LBA, target LBA, move count, move type, and command code. The initial LBA is to replace the conventional Read DMA (Direct Memory Access) command, and specifies the logical block address of a source block. The target LBA is to replace the conventional Write DMA command, and specifies the logical block address of a target block. The move count defines the number of blocks to be moved internally. The move type specifies if the command is an internal data swap command (e.g., Type=0) or an internal data move with auto-free command (e.g., Type=1). In addition, in one exemplary design, the command code is defined as IDM-1. Therefore, an exemplary SATA (Serial ATA) protocol trace under the new command protocol is as follows. Hereinafter, "H2D" is an abbreviation of "Host to Device", "D2H" is an abbreviation of "Device to Host", and "FIS" is an abbreviation of "Frame Information Structure".

Figure 5:
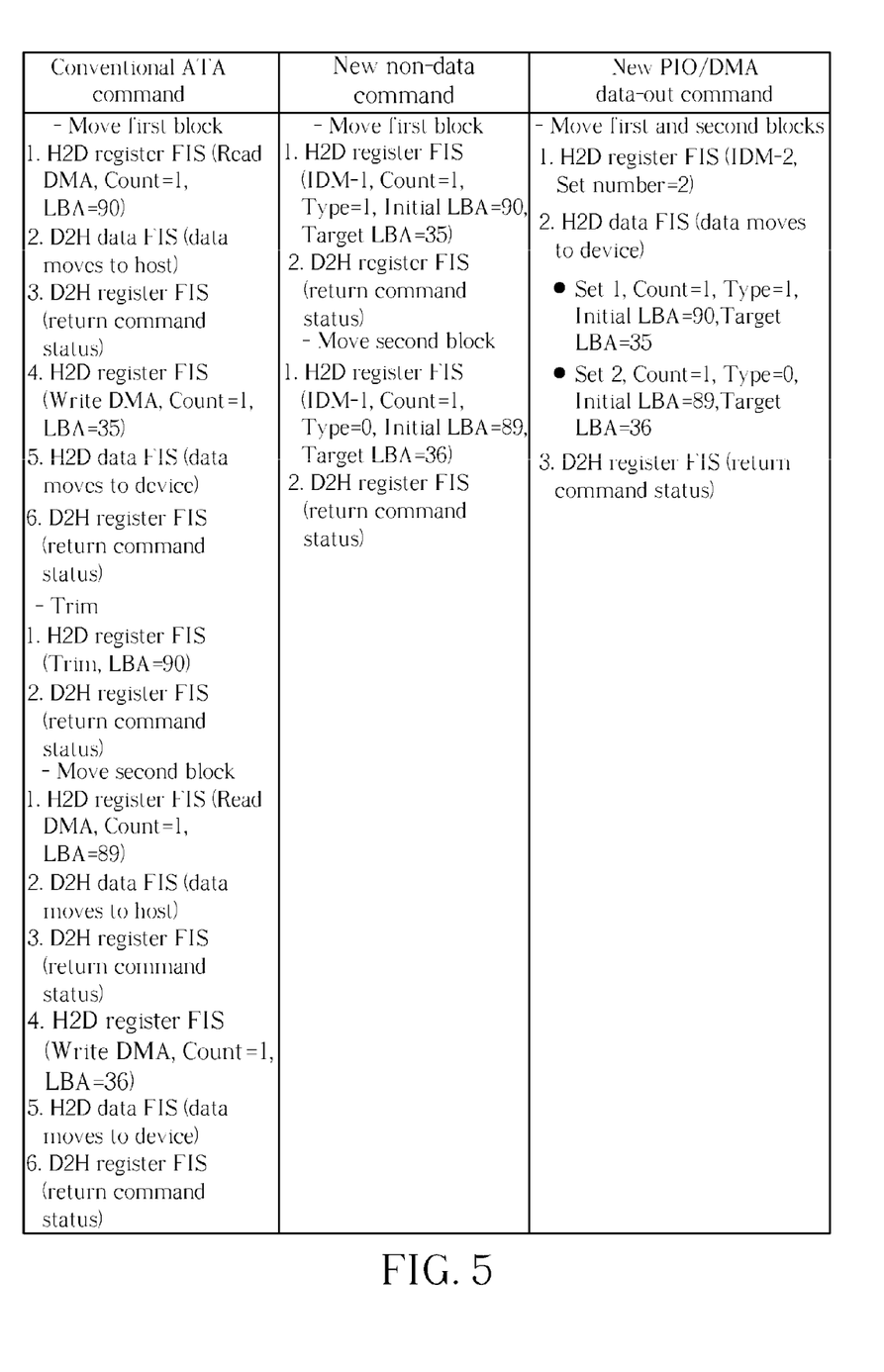
FIG. 5 is a comparison table of the conventional ATA command, the new non-data command, and the new PIO/DMA data-out command.

Move a First Block
H2D Register FIS (IDM-1, Count=1, Type=1, Initial LBA=90, Target LBA=35)
D2H Register FIS (return command status)
Move a Second Block
H2D Register FIS (IDM-1, Count=1, Type=0, Initial LBA=89, Target LBA=36)
D2H Register FIS (return command status)

It should be noted that the internal data move with auto-free command as mentioned above will release a physical block to be a free block; however, processing the address mapping table to serve a data move command without changing the block status still obeys the spirit of the present invention since the command is also served by processing the address mapping table without physically accessing the storage medium. For example, in an alternative design, the command CMD is an internal data move command for simply moving the first data stored in the physical address of the storage medium 102 to a specific physical address of the storage medium 102, and the processing unit 110 serves the command CMD through updating the address mapping table MT by replacing the recorded physical address of the first data mapped to the logical address of the first data with the specific physical address. In this way, the updated address mapping table records the specific physical address mapped to the logical address of the first data. This also falls within the scope of the present invention.

Regarding the above-mentioned internal data move commands, a single data move or data swap is completed by processing the address mapping table MT without physically accessing the storage medium 102. To simplify the command handling, an exemplary embodiment of the present invention further proposes a new PIO (Programming Input/Output)/DMA data-out command specified by a command code IDM-2, based on the new non-data command mentioned above. For example, the command CMD is a single command with a plurality of command sets transmitted via payload data thereof, and the processing unit 110 serves the single command CMD by referring to the command sets transmitted via the single command CMD for sequentially updating the address mapping table MT in response to the single command CMD. Therefore, an exemplary SATA protocol trace under the new command protocol is as follows.

Move a First Block and a Second Block
H2D Register FIS (IDM-2, Set number=2)
H2D Data FIS
Set 1, Count=1, Type=1, Initial LBA=90, Target LBA=35
Set 2, Count=1, Type=0, Initial LBA=89, Target LBA=36
D2H Register FIS (return command status)

For clarity, a comparison of the conventional ATA command, the new non-data command, and the new PIO/DMA data-out command is shown in FIG. 5. As a person skilled in the art can readily understand the operation of the conventional ATA command, further description is omitted here for brevity. As one can see from FIG. 5, performing file defragmentation by using the new command protocol proposed by the exemplary embodiment of the present invention does not need to physically access the storage medium. Thus, the original service life of an SSD drive which employs the new command protocol to perform the file defragmentation will not be affected; additionally, as there is no physical data transfer between the storage medium 102 and the host 101, the file defragmentation performance can be improved greatly by the new command protocol.

It should be noted that the Read DMA command, the Write DMA command, and the Trim command, as shown in FIG. 5, are well defined in the ATA specification. For example, the Read DMA command allows the host 101 to read data from the storage medium 102 using a DMA data transfer protocol; the Write DMA command allows the host 101 to write data into the storage medium 102 using the DMA data transfer protocol; and the Trim command allows the host 101 to free data blocks of the storage medium 102 that are no longer in use, such as those left by deleted or moved files. As a person skilled in the pertinent art can readily understand these conventional ATA commands, further description is omitted here for brevity.

Figure 6:
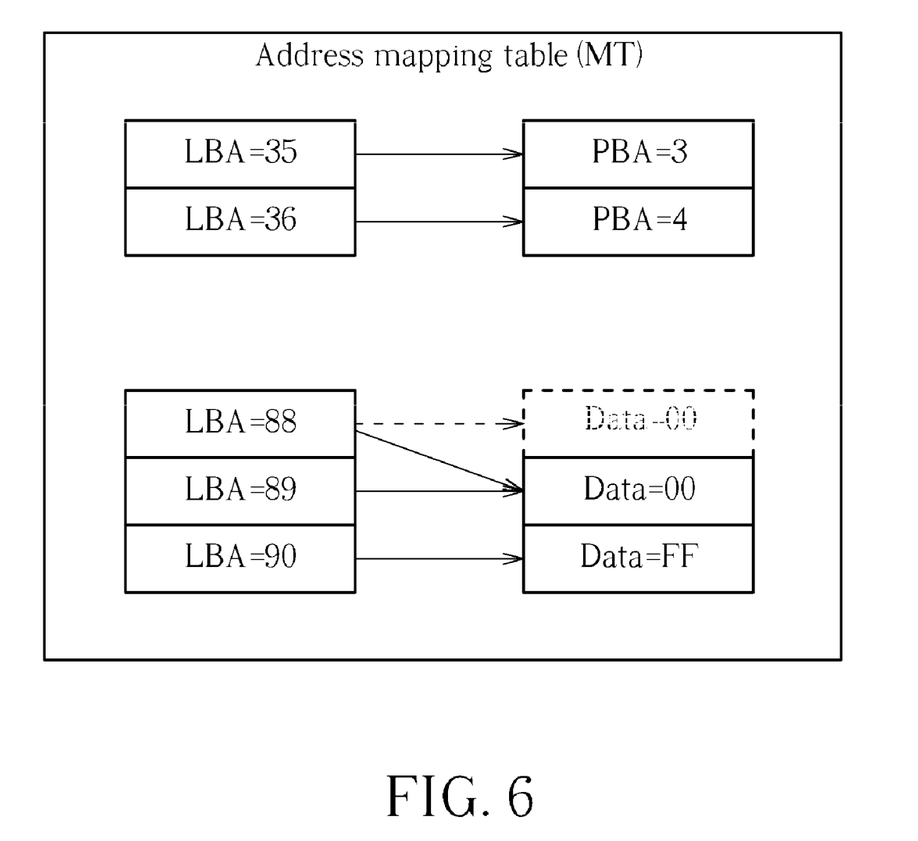
FIG. 6 shows another exemplary address mapping table.

In addition to recording a mapping between a logical address and a physical address, the exemplary address mapping table MT of the present invention may record a particular data pattern (e.g., a constant data pattern) mapped to a logical address. Please refer to FIG. 6, which shows another exemplary address mapping table MT. As can be seen from FIG. 6, the logical block address "35" is mapped to the physical block address "3", the logical block address "36" is mapped to the physical block address "4", the logical block address "88" is mapped to one particular data pattern "00" instead of a physical block address, the logical block address "89" is mapped to one particular data pattern "00" instead of a physical block address, and the logical block address "90" is mapped to another particular data pattern "FF" instead of a physical block address. In one exemplary design, the address mapping table MT stores a single copy of a particular data pattern, and any logical block address corresponding to the particular data pattern is mapped to the single copy of the particular data pattern. As shown in FIG. 6, the logical block addresses "88" and "89" are both mapped to the same copy of the particular data pattern "00". In this way, the size of the address mapping table MT can be smaller, and the capacity requirement of the storage unit 120 is reduced. In an alternative design, multiple copies of the same particular data pattern are recorded in the address mapping table MT, where each copy of the particular data pattern is mapped to a logical block address corresponding to the particular data pattern. As shown in FIG. 6, the logical block addresses "88" and "89" may be configured to be mapped to different copies of the same particular data pattern "00".

Please refer to FIG. 1 in conjunction with FIG. 6. When the command CMD (e.g., a read command) issued from the host 101 is for reading data addressed by one of the logical block addresses "88", "89" and "90" from the storage medium 102, the processing unit 110 outputs the corresponding particular data pattern, "00" or "FF", recorded in the address mapping table MT in response to the command without controlling the storage medium 102 to physically access data stored therein. On the other hand, when the command CMD (e.g., a read command) issued from the host 101 is for reading data addressed by one of the logical block addresses "35" and "36" from the storage medium 102, the processing unit 110 refers to the address mapping table MT to find the mapped physical block address and controls the storage medium 102 to output data stored in a physical block addressed by the physical block address obtained from the address mapping table MT.

Figure 7:
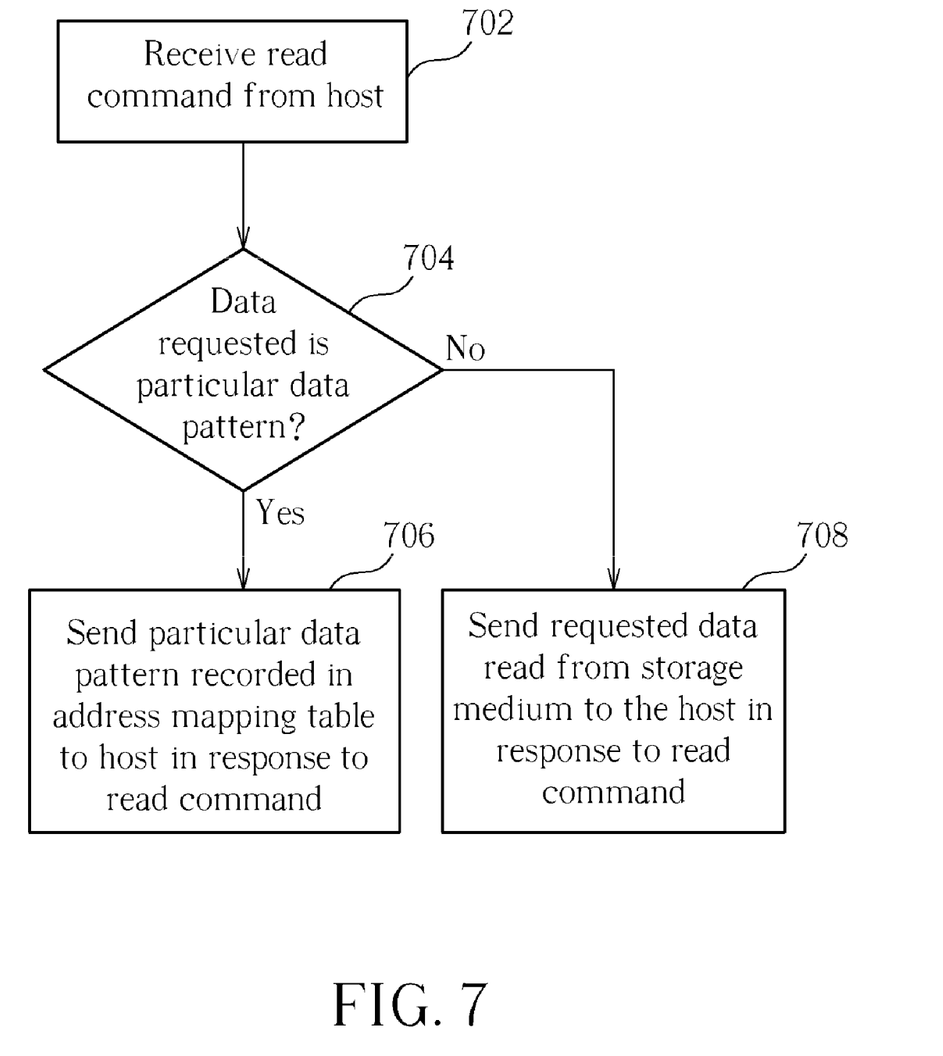
FIG. 7 is a flowchart of serving a read command generated from a host according to an exemplary embodiment of the present invention.
Figure 8:
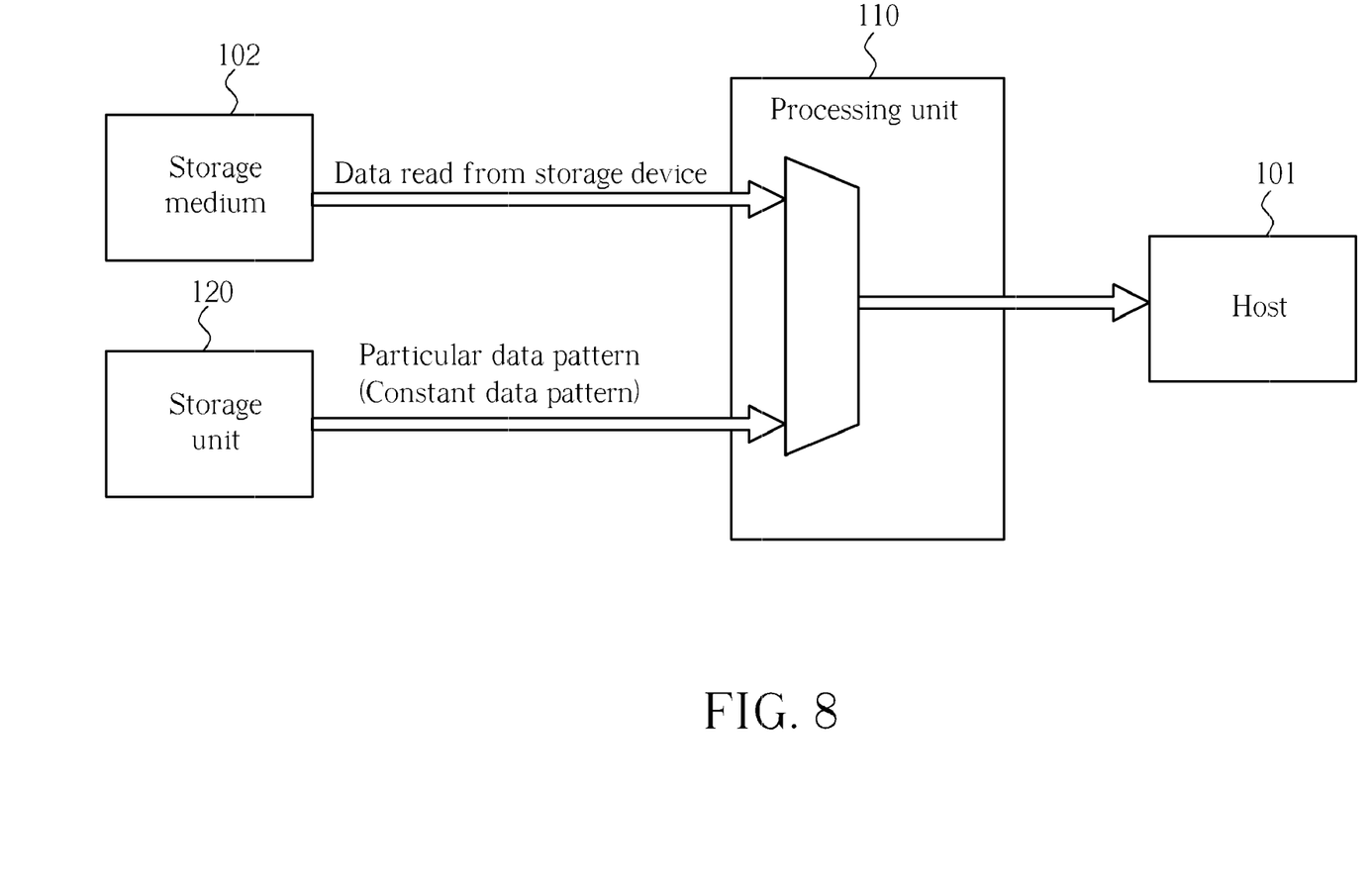
FIG. 8 is a diagram showing an internal data flow of a processing unit when a read command is received by a storage controller.

Please refer to FIG. 7 in conjunction with FIG. 8. FIG. 7 is a flowchart of serving a read command generated from a host according to an exemplary embodiment of the present invention. FIG. 8 is a diagram showing an internal data flow of the processing unit 110 when a read command is received by the storage controller 100. The flowchart shown in FIG. 7 includes following steps:

Step 702: Receive a read command from a host.

Step 704: Check an address mapping table to see if a logical address of a data requested by the read command is mapped to a particular data pattern (e.g., "00" or "FF"). If yes, go to step 706; otherwise, go to step 708.

Step 706: Send the particular data pattern recorded in the address mapping table to the host, directly.

Step 708: Read the requested data from the storage medium, and send the requested data read from the storage medium to the host.

As shown in FIG. 8, the processing unit 110 selectively outputs the particular data pattern (e.g., a constant data pattern) derived from the address mapping table buffered in the storage unit 120 or data read from the storage medium 102 to the host 101. As a person skilled in the art can readily understand operation of each step included in the flowchart in FIG. 7 after reading above paragraphs, further description is omitted here for brevity.

The particular data pattern may be detected in special timings, and then the address mapping table MT is updated to record each mapping between a logical address and the detected particular data pattern. It should be noted that after the mapping between a logical address and a detected particular data pattern is recorded in the address mapping table MT, the storage space of the storage medium 102 that stores the detected particular data pattern may be released as free space. In a first exemplary design, when receiving a command for formatting a physical block of the storage medium 102 corresponding to a logical address prior to receiving the command for reading data addressed by the logical address from the storage medium 102, the processing unit 110 further sets the address mapping table MT to map the logical address to a particular data pattern, such as "00" or "FF". In a second exemplary design, when receiving a command (e.g., an ATA Trim command) for releasing a physical block of the storage medium 102 corresponding to a logical address prior to receiving the command for reading data addressed by the logical address from the storage medium 102, the processing unit 110 further sets the address mapping table MT to map the logical address to the particular data pattern. In a third exemplary design, when receiving a command for writing a particular data pattern addressed by a logical address into the storage medium 102 prior to receiving the command for reading data addressed by the logical address from the storage medium 102, the processing unit 110 further sets the address mapping table MT to map the logical address to the particular data pattern. In a fourth exemplary design, when receiving a command for reading a particular data pattern addressed by a logical address from the storage medium 102 prior to receiving the command for reading data addressed by the logical address from the storage medium 102, the processing unit 110 further sets the address mapping table MT to map the logical address to the particular data pattern in the address mapping table MT. In a fifth exemplary design, before receiving the command for reading data addressed by the logical address from the storage medium 102, the processing unit 110 further detects if the storage medium 102 has the particular data pattern stored therein. If the processing unit 110 detects that the storage medium 102 has the particular data pattern stored therein, the processing unit 110 further sets the address mapping table MT to map the logical address to the particular data pattern. The detection of the particular data pattern may be performed during a background process of the storage device, such as a garbage collection process, a wear-leveling process, or an error detection process.

With regard to the data recording operation, when the processing unit 110 receives the command CMD (e.g., a write command) for writing a particular data pattern (e.g., "00" or "FF") addressed by a logical address into the storage medium 102, the processing unit 110 sets the address mapping table MT to record the particular data pattern mapped to the logical address in response to the command CMD without controlling the storage medium 102 to physically record the data whose content is the particular data pattern. For example, when the write command is for writing a particular data pattern "00" addressed by the logical block address "88" into the storage medium 102, the processing unit 110 sets the logical block address "88" in the address mapping table MT to be mapped to the particular data pattern "00", as shown in FIG. 6.

Figure 9:
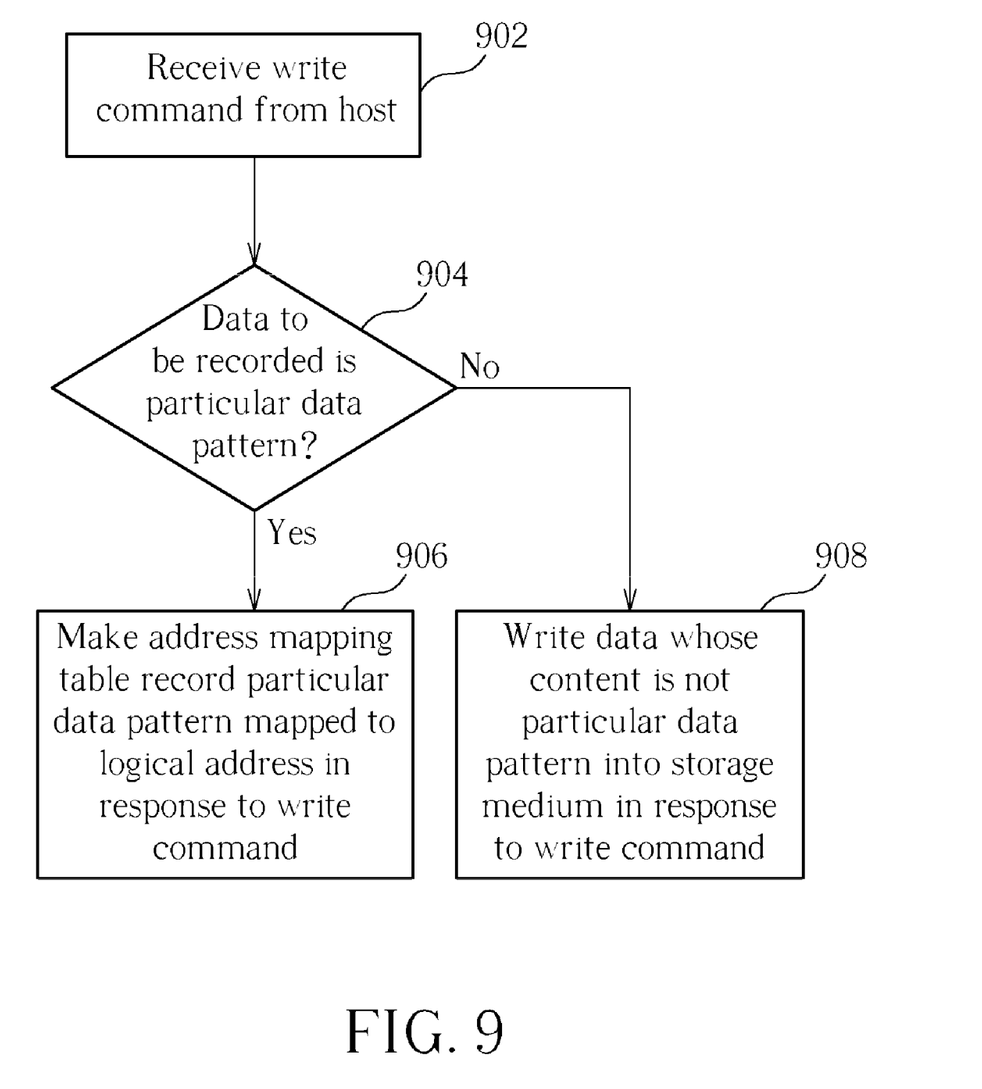
FIG. 9 is a flowchart of serving a write command generated from a host according to an exemplary embodiment of the present invention.
Figure 10:
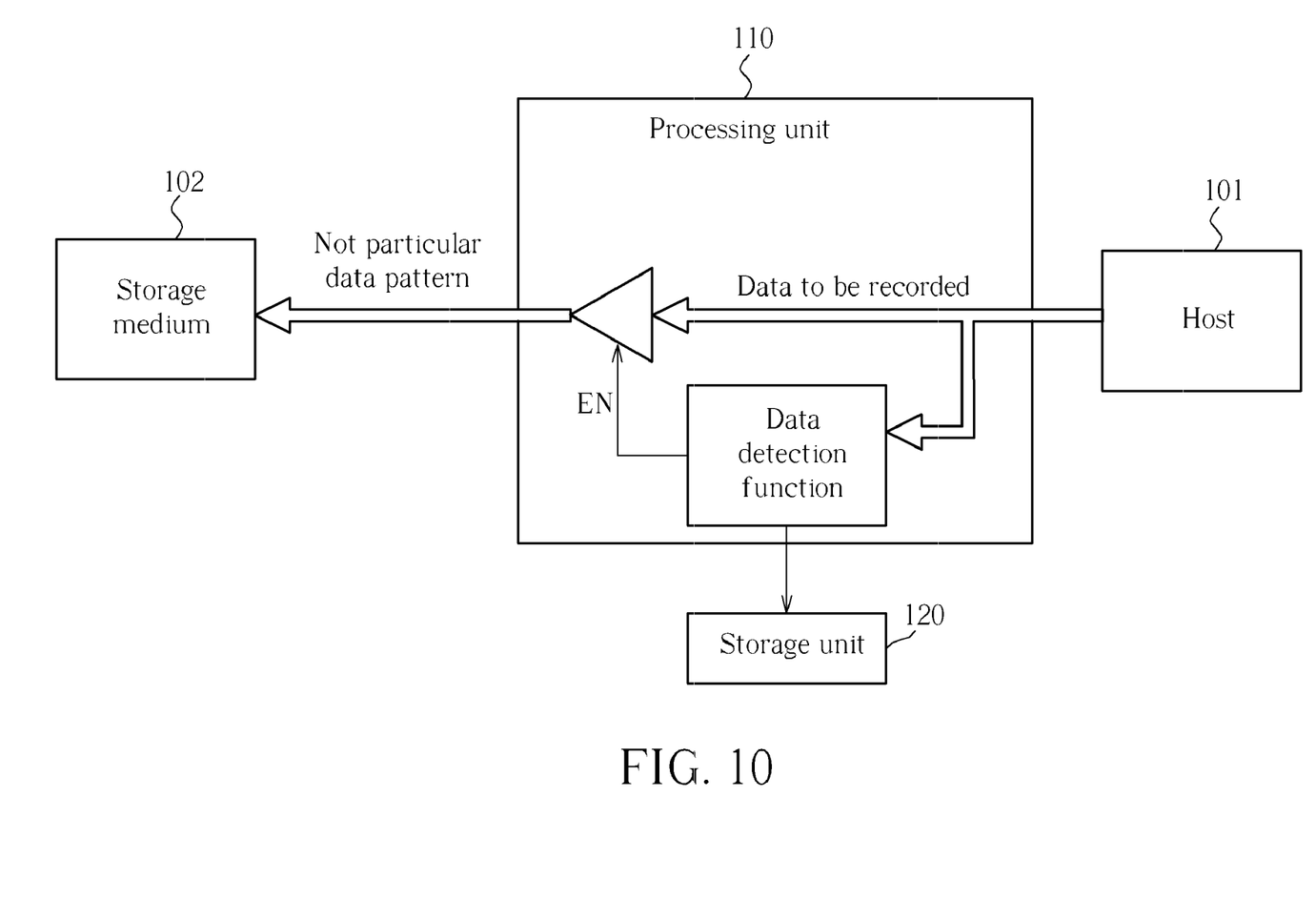
FIG. 10 is a diagram showing an internal data flow of a processing unit when a write command is received by a storage controller.

Please refer to FIG. 9 in conjunction with FIG. 10. FIG. 9 is a flowchart of serving a write command generated from a host according to an exemplary embodiment of the present invention. FIG. 10 is a diagram showing an internal data flow of the processing unit 110 when a write command is received by the storage controller 100. The flowchart shown in FIG. 9 includes following steps:

Step 902: Receive a write command from a host.

Step 904: Check if the data to be recorded is a particular data pattern (e.g., "00" or "FF"). If yes, go to step 906; otherwise, go to step 908.

Step 906: Make the address mapping table record the particular data pattern mapped to a logical address in response to the write command without physically writing the data whose content is the particular data pattern into the storage medium.

Step 908: Write the data whose content is not the particular data pattern into the storage medium.

As shown in FIG. 10, the processing unit 110 is equipped with data detection function to check if the data to be recorded is the particular data pattern. The processing unit 110 allows the data received from the host 101 to be recorded into the storage medium 102 when no particular data pattern is detected, and changes the address mapping table stored in the storage unit 120 when detecting that the data received from the host 101 contains the particular data pattern. As a person skilled in the art can readily understand operation of each step included in the flowchart in FIG. 9 after reading above paragraphs, further description is omitted here for brevity.

To reduce the data amount, a data compression technique can be employed by the processing unit 110. For example, when receiving a write command from the host 101, the processing unit 110 checks if the data received from the host 101 is compressible. If yes, the processing unit 110 compresses the received data, and then writes the compressed data into the storage medium 102; otherwise, the processing unit 110 directly writes the received data into the storage medium 102. In addition, the address mapping table MT may be configured to further record address information of the compressed data stored into the storage medium 102. With regarding the data reading operation, a data decompression technique is therefore employed by the processing unit 110 to recover the original data by decompressing the compressed data. For example, when receiving a read command from the host 101, the processing unit 110 checks the address mapping table MT to see if the requested data needs decompression. If yes, the processing unit 110 decompresses the data, and then outputs the decompressed data to the host 101; otherwise, the processing unit 110 directly outputs the requested data to the host 101.

Furthermore, as the contents of a page file/swap file allocated in the storage medium 102 are modified frequently and the empty space in the storage medium 102 has no valid data stored therein, there is no need to perform file defragmentation upon the page file/swap file and the empty space. If the storage controller 100 is informed of the address ranges of the page file/swap file and the empty space, the file defragmentation performance can be improved; additionally, the garbage collection performed upon the identified page file/swap file may be omitted or simplified, and the identified empty space may be used by the storage controller 100 for other purposes. An exemplary embodiment of the present invention therefore proposes a new command to inform the storage controller 100 of the address range of the page file, and proposes another new command to inform the storage controller 100 of the address range of the empty space. By way of example, but not limitation, exemplary SATA protocol traces are as follows.

Page File Area
H2D Register FIS (Page file area, Start LBA=90, End LBA=100)
D2H Register FIS (return command status)
Empty Space
H2D Register FIS (Empty space, Start LBA=90, End LBA=100)
D2H Register FIS (return command status)

Those skilled in the art will readily observe that numerous modifications and alterations of the device and method may be made while retaining the teachings of the invention.

What is claimed is:

1. A method of managing data access of a storage medium, comprising:
   establishing an address mapping table to record at least a physical address of a first data stored in the storage medium, where the physical address of the first data is mapped to a logical address of the first data; and
   when receiving a command for handling at least the first data stored in the storage medium internally, processing the address mapping table to serve the command without physically accessing at least the first data stored in the storage medium;
   wherein the command is a single command with a plurality of command sets transmitted via payload data thereof; and the step of processing the address mapping table to serve the command comprises:
   referring to the command sets transmitted via the single command for sequentially updating the address mapping table in response to the single command.

2. The method of claim 1, wherein the address mapping table further records a physical address of a second data stored in the storage medium, where the physical address of the second data is mapped to a logical address of the second data; the command includes swapping the first data and the second data stored in the storage medium; and the step of updating the address mapping table in response to the single command comprises:
   updating the address mapping table by swapping the recorded physical address of the first data mapped to the logical address of the first data and the recorded physical address of the second data mapped to the logical address of the second data;
   wherein the updated address mapping table records the physical address of the first data mapped to the logical address of the second data, and records the physical address of the second data mapped to the logical address of the first data.

3. The method of claim 1, wherein the command includes moving the first data stored in the physical address to a specific physical address of the storage medium, and the step of updating the address mapping table in response to the single command comprises:
   updating the address mapping table by replacing the recorded physical address of the first data mapped to the logical address of the first data with the specific physical address, wherein the updated address mapping table records the specific physical address mapped to the logical address of the first data.

4. The method of claim 1, wherein the address mapping table further records a block status indicating that a physical block addressed by the physical address of the first data is a used block; the command includes moving the first data stored in the physical address to a specific physical address of the storage medium and releasing the physical block addressed by the physical address, and the step of updating the address mapping table in response to the single command comprises:
   updating the address mapping table by replacing the physical address of the first data mapped to the logical address of the first data with the specific physical address, and modifying the block status of the physical block to indicate that the physical block is a free block, wherein the updated address mapping table records the specific physical address mapped to the logical address of the first data.

5. A method of managing data access of a storage medium, comprising:
   establishing an address mapping table which records a particular data pattern mapped to a logical address; and
   when receiving a command for reading data addressed by the logical address from the storage medium, outputting the particular data pattern recorded in the address mapping table in response to the command without physically accessing the storage medium.

6. The method of claim 5, wherein the step of establishing the address mapping table comprises:
when receiving a command for formatting a physical block of the storage medium corresponding to the logical address, mapping the logical address to the particular data pattern in the address mapping table.

7. The method of claim 5, wherein the step of establishing the address mapping table comprises:
when receiving a command for releasing a physical block of the storage medium corresponding to the logical address, mapping the logical address to the particular data pattern in the address mapping table.

8. The method of claim 5, wherein the step of establishing the address mapping table comprises:
when receiving a command for writing the particular data pattern mapped to the logical address into the storage medium, mapping the logical address to the particular data pattern in the address mapping table.

9. The method of claim 5, wherein the step of establishing the address mapping table comprises:
when receiving a command for reading the particular data pattern mapped to the logical address from the storage medium, mapping the logical address to the particular data pattern in the address mapping table.

10. The method of claim 5, wherein the step of establishing the address mapping table comprises:
detecting if the storage medium has the particular data pattern stored therein; and
when detecting that the storage medium has the particular data pattern stored therein, mapping the logical address to the particular data pattern in the address mapping table.

11. The method of claim 10, wherein detecting if the storage medium has the particular data pattern stored therein is performed during a background process of the storage medium.

12. The method of claim 11, wherein the background process is a garbage collection process, a wear-leveling process, or an error detection process.

13. A method of managing data access of a storage medium, comprising:
providing an address mapping table; and
when receiving a command for writing a particular data pattern addressed by a logical address into the storage medium, having the address mapping table record the particular data pattern addressed by the logical address in response to the command without physically accessing the storage medium.

14. A storage controller for managing data access of a storage medium, comprising:
a storage unit, storing an address mapping table to record at least a physical address of a first data stored in the storage medium, where the physical address of the first data is mapped to a logical address of the first data; and
a processing unit, coupled to the storage unit, wherein when receiving a command for handling at least the first data in the storage medium internally, the processing unit processes the address mapping table to serve the command without controlling the storage medium to physically accessing at least the first data stored therein;
wherein the command is a single command with a plurality of command sets transmitted via payload data thereof; and the processing unit refers to the command sets transmitted via the single command for sequentially updating the address mapping table in response to the single command.

15. The storage controller of claim 14, wherein the address mapping table further records a physical address of a second data stored in the storage medium, where the physical address of the second data is mapped to a logical address of the second data; the command includes swapping the first data and the second data stored in the storage medium; and the processing unit is operative to update the address mapping table by swapping the recorded physical address of the first data mapped to the logical address of the first data and the recorded physical address of the second data mapped to the logical address of the second data, where the updated address mapping table stored in the storage unit records the physical address of the first data mapped to the logical address of the second data, and records the physical address of the second data mapped to the logical address of the first data.

16. The storage controller of claim 14, wherein the command includes moving the first data stored in the physical address to a specific physical address of the storage medium; and the processing unit is operative to update the address mapping table by replacing the recorded physical address of the first data mapped to the logical address of the first data with the specific physical address, wherein the updated address mapping table stored in the storage unit records the specific physical address mapped to the logical address of the first data.

17. The storage controller of claim 14, wherein the address mapping table further records a block status indicating that a physical block addressed by the physical address of the first data is a used block; the command includes moving the first data stored in the physical address to a specific physical address of the storage medium and releasing the physical block addressed by the physical address; and the processing unit is operative to update the address mapping table by replacing the physical address of the first data mapped to the logical address of the first data with the specific physical address, and modifying the block status of the physical block to indicate that the physical block is a free block, where the updated address mapping table records the specific physical address mapped to the logical address of the first data.

18. A storage controller for managing data access of a storage medium, comprising:
a storage unit, storing an address mapping table which records a particular data pattern mapped to a logical address; and
a processing unit, coupled to the storage unit, wherein when receiving a command for reading data addressed by the logical address from the storage medium, the processing unit outputs the particular data pattern recorded in the address mapping table in response to the command without controlling the storage medium to physically access data stored therein.

19. The storage controller of claim 18, wherein when receiving a command for formatting a physical block of the storage medium corresponding to the logical address prior to receiving the command for reading data addressed by the logical address from the storage medium, the processing unit is operative to set the address mapping table to map the logical address to the particular data pattern.

20. The storage controller of claim 18, wherein when receiving a command for releasing a physical block of the storage medium corresponding to the logical address prior to receiving the command for reading data addressed by the logical address from the storage medium, the processing unit is operative to set the address mapping table to map the logical address to the particular data pattern.

21. The storage controller of claim 18, wherein when receiving a command for writing the particular data pattern mapped to the logical address into the storage medium prior to receiving the command for reading data addressed by the logical address from the storage medium, the processing unit is operative to set the address mapping table to map the logical address to the particular data pattern.

22. The storage controller of claim 18, wherein when receiving a command for reading the particular data pattern mapped to the logical address from the storage medium prior to receiving the command for reading data addressed by the logical address from the storage medium, the processing unit is operative to set the address mapping table to map the logical address to the particular data pattern.

23. The storage controller of claim 18, wherein before receiving the command for reading data addressed by the logical address from the storage medium, the processing unit is operative to detect if the storage medium has the particular data pattern stored therein, where when detecting that the storage medium has the particular data pattern stored therein, the processing unit is operative to set the address mapping table to map the logical address to the particular data pattern.

24. The storage controller of claim 23, wherein the processing unit detects if the storage medium has the particular data pattern stored therein during a background process of the storage medium.

25. The storage controller of claim 24, wherein the background process is a garbage collection process, a wear-leveling process, or an error detection process.

26. A storage controller for managing data access of a storage medium, comprising:
- a storage unit, storing an address mapping table; and
- a processing unit, coupled to the storage unit, wherein when receiving a command for writing a particular data pattern addressed by a logical address into the storage medium, the processing unit is operative to set the address mapping table to record the particular data pattern addressed by the logical address in response to the command without controlling the storage medium to physically record the particular data pattern addressed by the logical address.

27. A method of managing data access of a storage medium, comprising:
- establishing an address mapping table to record at least a physical address of a first data stored in the storage medium, where the physical address of the first data is mapped to a logical address of the first data; and
- when receiving a command for handling at least the first data stored in the storage medium internally, processing the address mapping table to serve the command without physically accessing at least the first data stored in the storage medium;
- wherein the address mapping table further records a block status indicating that a physical block addressed by the physical address of the first data is a used block; the command is for moving the first data stored in the physical address to a specific physical address of the storage medium and releasing the physical block addressed by the physical address, and the step of processing the address mapping table to serve the command comprises:
- updating the address mapping table by replacing the physical address of the first data mapped to the logical address of the first data with the specific physical address, and modifying the block status to indicate that the physical block is a free block, wherein the updated address mapping table records the specific physical address mapped to the logical address of the first data.

28. A storage controller for managing data access of a storage medium, comprising:
- a storage unit, storing an address mapping table to record at least a physical address of a first data stored in the storage medium, where the physical address of the first data is mapped to a logical address of the first data; and
- a processing unit, coupled to the storage unit, wherein when receiving a command for handling at least the first data in the storage medium internally, the processing unit processes the address mapping table to serve the command without controlling the storage medium to physically accessing at least the first data stored therein;
- wherein the address mapping table further records a block status indicating that a physical block addressed by the physical address of the first data is a used block; the command is for moving the first data stored in the physical address to a specific physical address of the storage medium and releasing the physical block addressed by the physical address; and the processing unit is operative to update the address mapping table by replacing the physical address of the first data mapped to the logical address of the first data with the specific physical address, and modifying the block status to indicate that the physical block is a free block, where the updated address mapping table records the specific physical address mapped to the logical address of the first data.

* * * * *